April 28, 1931.  A. P. CLAYTON  1,803,172
TUBE CONVEYER
Filed Jan. 27, 1930   2 Sheets-Sheet 1
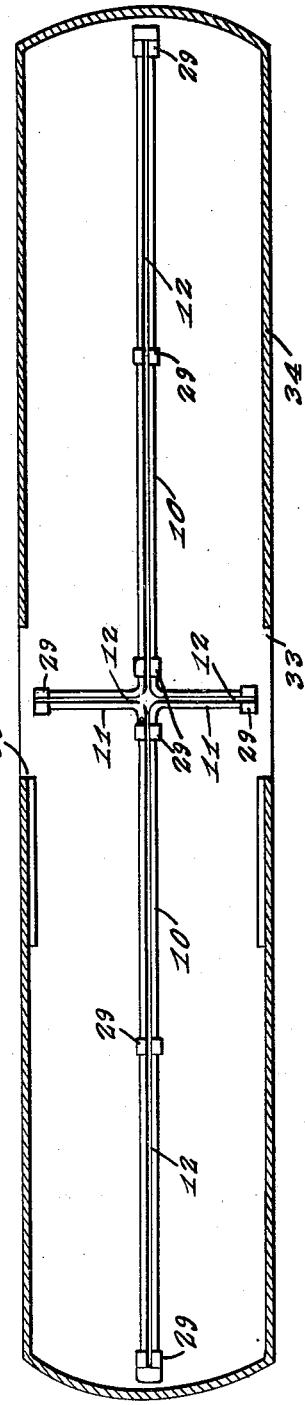
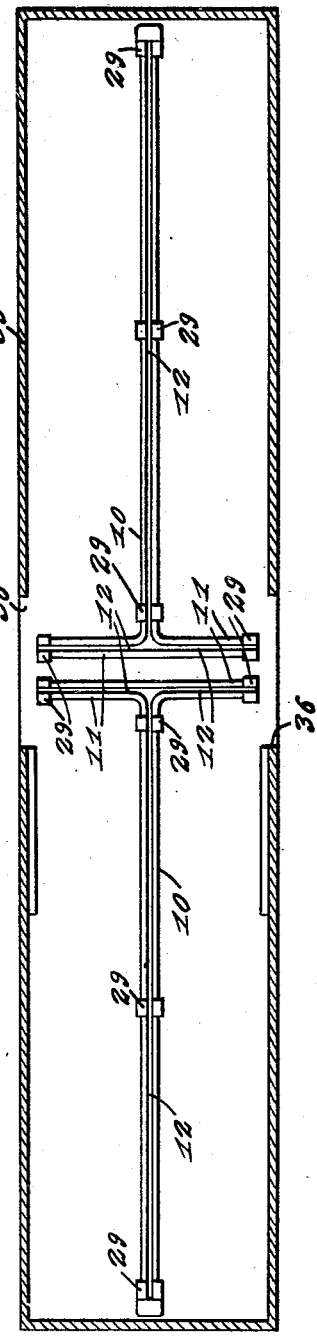
A. P. Clayton, INVENTOR
BY Victor J. Evans
ATTORNEY

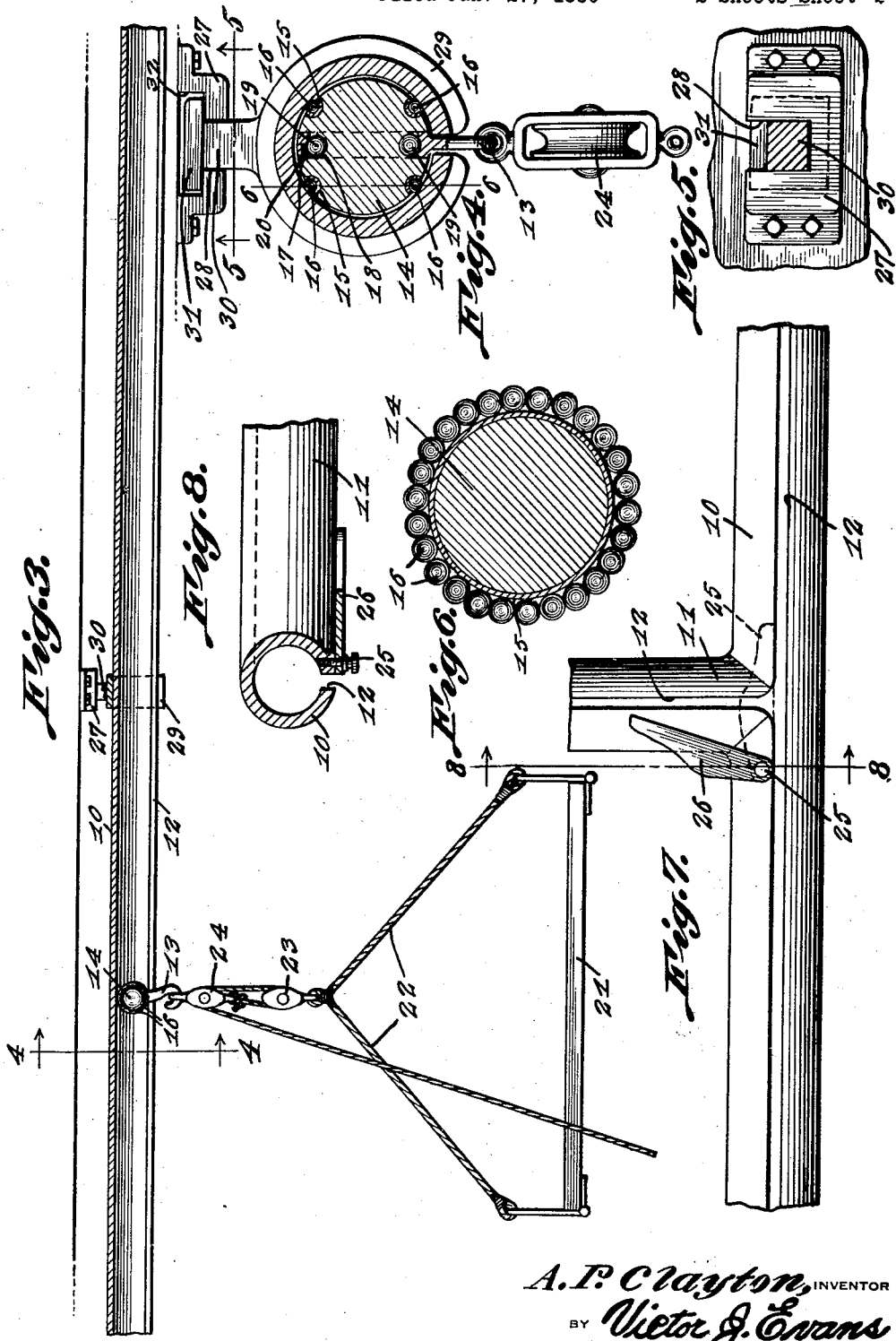

positioned in pockets 32 formed in the brackets 27 with the shanks and necks 30 extending through the notches in the brackets.

Any desired arrangement of tracks may be provided. For example in Figure 1 of the drawings the main track 10 extends continuously from one to the other end of the car and branch tracks 11 extend in opposite directions centrally from the main track to the doors 33 of the car 34.

In Figure 2 the track is shown as formed of separate sections, each section including a main track 10 and branch tracks 11 extending in opposite directions from one end of the main track. These branch tracks extend transversely of the car 35 adjacent the doors 36. By this means the cars may be unloaded simultaneously from opposite ends.

The invention is susceptible of various changes in its form, proportions and minor details of construction and the right is herein reserved to make such changes as properly fall within the scope of the appended claim.

Having described the invention what is claimed is:—

In a conveyer, a tubular track having a longitudinally disposed slot therein, and a carriage operating within the tubular track, said carriage comprising a spherical member having spaced ball races therein and a central groove between said races, anti-friction devices within the races and groove, a ring disposed within the groove and bearing upon the anti-friction devices, and an attaching member carried by the ring.

In testimony whereof I affix my signature.

ARCHIE P. CLAYTON.